United States Patent [19]
Carroll

[11] Patent Number: 4,577,655
[45] Date of Patent: Mar. 25, 1986

[54] APPARATUS FOR INSULATING WATER FAUCETS

[76] Inventor: James M. Carroll, Sowell Rd., Madison, Miss. 39110

[21] Appl. No.: 623,500

[22] Filed: Jun. 22, 1984

[51] Int. Cl.⁴ ............................................. F16K 51/00
[52] U.S. Cl. .................... 137/375; 137/382; 138/149; 411/400
[58] Field of Search ................ 411/400; 137/375, 382; 138/149

[56] References Cited

U.S. PATENT DOCUMENTS

| | | | |
|---|---|---|---|
| 2,157,189 | 5/1939 | Schlösinger | 411/400 |
| 2,686,530 | 8/1954 | Dire | 137/382 |
| 4,071,043 | 1/1978 | Carlson | 137/375 |
| 4,103,701 | 8/1978 | Jerg | 137/375 |
| 4,244,394 | 1/1981 | Hartselle, III | 137/375 |
| 4,449,554 | 8/1984 | Busse | 137/375 |
| 4,456,027 | 6/1984 | Belgand | 137/375 |

FOREIGN PATENT DOCUMENTS 572353 10/1945 United Kingdom ............... 411/400

Primary Examiner—A. Michael Chambers
Attorney, Agent, or Firm—George L. Williamson

[57] ABSTRACT

Apparatus for protecting faucets by enclosing them in a cover which has encased therein rigid foam insulating material with a threaded hook member for holding said cover to the faucet with both halves of said cover being provided with a rubber foam end seal to tightly and completely insulate the faucet.

2 Claims, 8 Drawing Figures

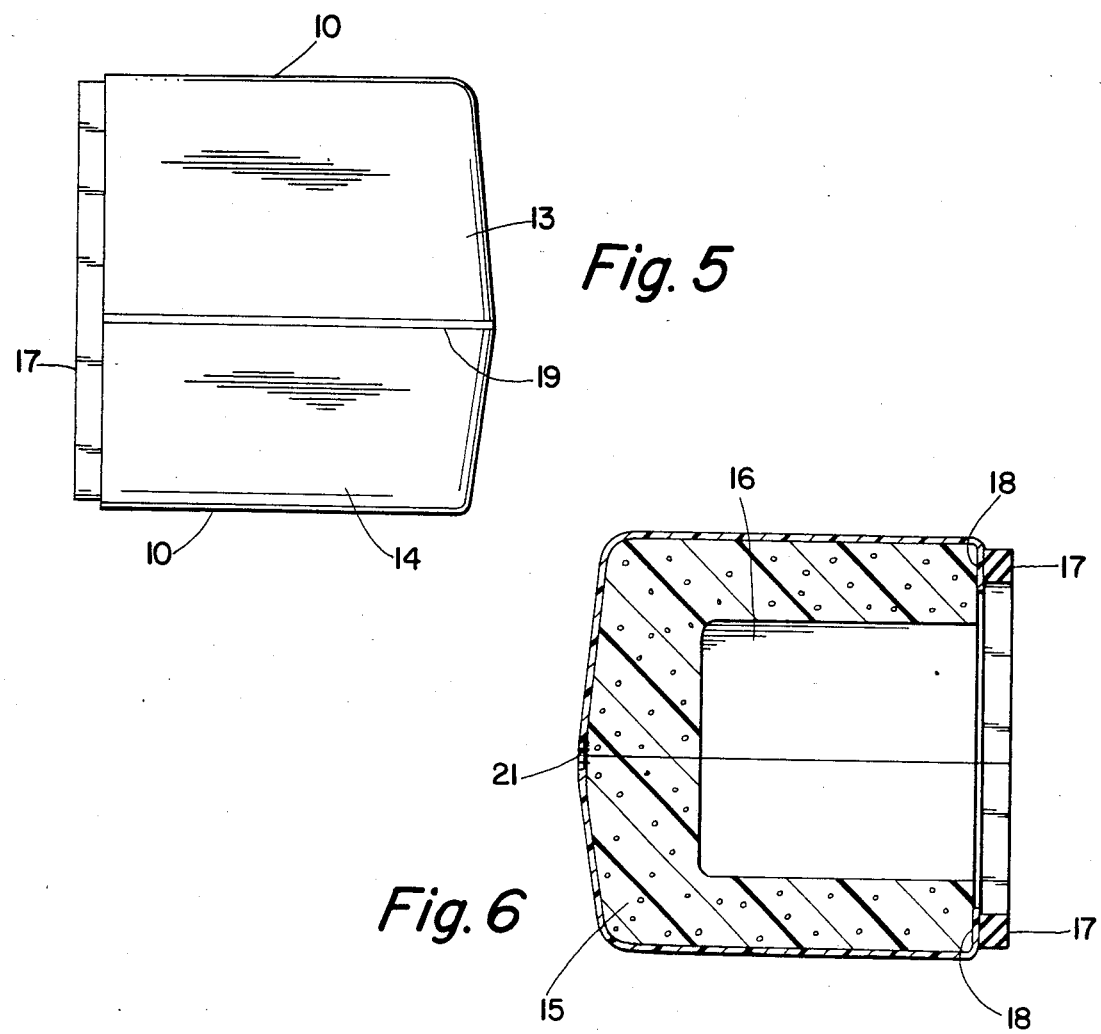

APPARATUS FOR INSULATING WATER FAUCETS

BACKGROUND OF THE INVENTION

The present invention generally relates to protecting plumbing fixtures and, more particularly, is concerned with the insulation and protection of water faucets from the adverse effects of freezing water.

Faucet insulators have been described in the prior art. In U.S. Pat. No. 2,686,530, Dire teaches an apparatus having a cylindrically shapped housing of rigid material lined with insulating material having one end open for placing over the faucet and a small hole in the closed end. In operation, the hook is connected to the faucet and the housing is pushed over the faucet with the chain being pulled tight placing the pin in the first link of the chain extending through the housing. In U.S. Pat. No. 4,244,394, Hartselle, III teaches an apparatus having a rigid elliptical plastic shell, and end seal and a fastening means which is a two-piece pawl and ratchet type fastener having the pawl fixed in such a fashion so that the end seal is fixed over the pipe extending from a wall, with the wrap extending through the closed end of the shell with a retainer holding the shell tightly against the wall.

In U.S. Pat. No. 4,071,043, Carlson teaches compressing two pieces of insulating flexible foam over a faucet and covering them with a solid rigid protective sleeve. In U.S. Pat. No. 2,650,180, Walker shows an apparatus of this type comprising pre-formed bodies of thermal insulating material having outer protective covers which are assembled about the faucet adjacent to the wall from which it extends, and then secured to one another in a manner to form an enclosure for the faucet. In U.S. Pat. No. 4,103,701, Jeng teaches a thermally insulated freeze proof cap which is installed with a specially designed face plate onto the existing outdoor faucet by screwing the cap through the face plate into the wall through which the faucet protrudes.

While the devices discussed previously herein have been described in the prior art, none of the previously cited art have been commercially successful. More than likely this is due to the fact that none of the prior art has been easily manufactured at a price which would make it commercially attractive to the consumer. Additionally, the prior art has not been easily mountable and removable from the faucet and/or insulated well enough to protect the faucet from actually freezing. Consequently, the need exists for improvements in faucet insulating devices which will result in greater utilization by the consumer.

Therefore, an objective of the present invention is to provide an apparatus of the type described above which can be manufactured at a reasonable price and which fully protect a faucet from the adverse effects of freezing weather.

A further objective of the present invention is to provide an apparatus of this type which, while being inexpensive to manufacture, is simple to assemble about the faucet; and, more particularly, one which actually seals the faucet from the effects of adverse weather conditions, particularly, those involving low temperatures.

A further objective of the present invention is to provide an apparatus of this type which is reusable and available in different sizes and colors for adaptation to various sizes and styles of faucets and exterior decoration schemes of homes and commercial and industrial buildings.

SUMMARY OF THE INVENTION

The present invention provides an apparatus to economically and easily insulate outside water faucets. The apparatus comprises a cover, which encloses a rigid foam insulating material which is provided with a threaded hook member to attach said cover to said faucet with said cover being provided with a foam rubber end seal to tightly insulate said faucet to a wall. The cover is manufactured in two halves wherein said process of manufacture the insulating material is inserted and mounted into both halves of the cover. Furthermore, the foam rubber end seal is attached to each half of the cover during the manufacturing process.

This apparatus can be manufactured cheaply and easily and it can be mounted very easily onto the faucet. Furthermore, the foam rubber end seal which is integerally mounted onto the rear of each cover half provides a complete seal of the faucet. Additionally, the threaded hook members provides a safe, secure and easily operable means for attaching said cover to said faucet.

BRIEF DESCRIPTION OF THE DRAWINGS

FIG. 5 is a left side elevation view of the apparatus.

FIG. 6 is a right side cross-sectional elevation view of the apparatus.

FIG. 7 is an elevation view of the hook and nut.

FIG. 8 is a plan view of the hook and nut.

DESCRIPTION OF THE PREFERRED EMBODIMENT (S)

Figure 1:
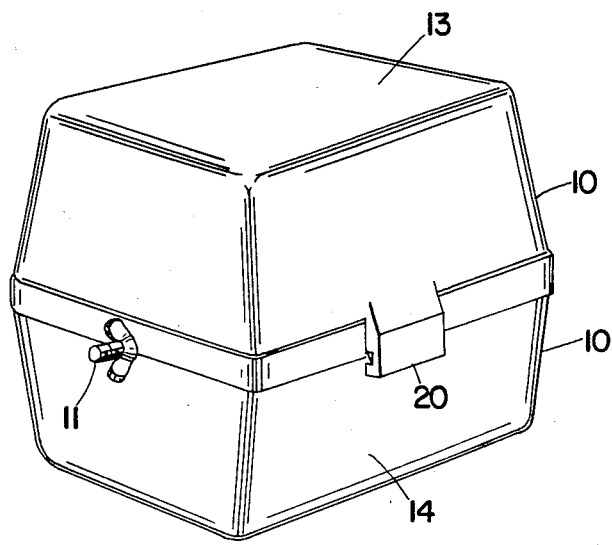
FIG. 1 is a pictorial perspective of the apparatus.

Referring now to the drawings, and more particularly to FIG. 1, there is perspectively shown the subject apparatus, generally designated 10, for insulating outside faucets to protect them from freezing temperatures. The apparatus 10 basically includes means 11 for attaching the apparatus 10 to the water faucet. The means in the preferred embodiment shown in FIGS. 1, 2, 7 and 8 is comprised of a threaded hook-bolt and wingnut to provide tightening means.

In the preferred embodiment of the apparatus 10 shown in FIGS. 1, 3, 4 and 5 the apparatus generally referred to 10 is actually composed of an upper half 13 and a lower half 14. The halves 13 and 14 are constructed of plastic which is relatively rigid and hard while being generally pliable and bendable.

Figure 2:
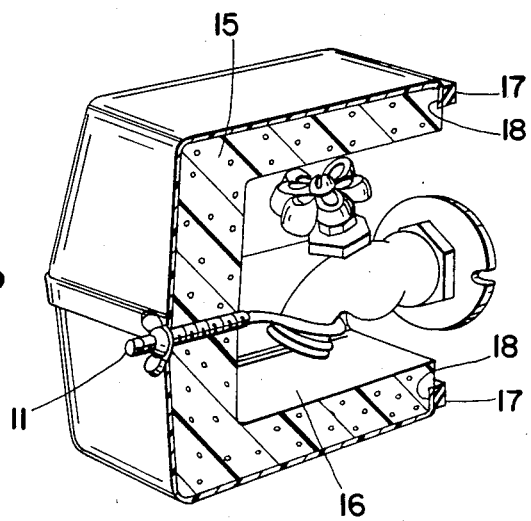
FIG. 2 is a right side cross-sectional view of the apparatus shown in operative connection.

In FIGS. 2 and 6 the upper and lower halves are filled with rigid insulating foam 15 which is pre-molded to fit each half. Said form 15 is mounted in the manufacturing process. Furthermore, said foam 15 is molded with a void for insertion around the faucet in order to provide ease of installation and close fit for the necessary installation. The void is shown as 16.

Shown in FIGS. 2, 3, 5 and 6 is the rubber insulating end seal 17 which is shown attached to each of the said upper and lower halves separately and individually on an over-hang 18 at back end of plastic shell as shown in FIGS. 2 and 6. Said seal 17 is attached in the manufacturing process with an adhesive, for example glue, to the back side of over-hang 18 of the said upper and lower cover halves which halves are mounted along with the said end seal directly on the fact of the wall.

Figure 3:
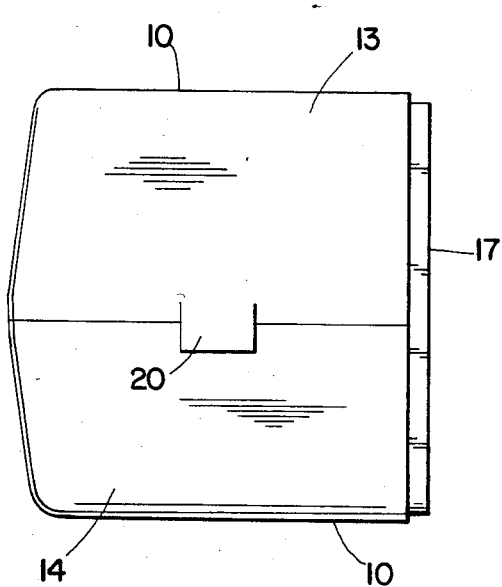
FIG. 3 is a right side elevation view of the apparatus.
Figure 4:
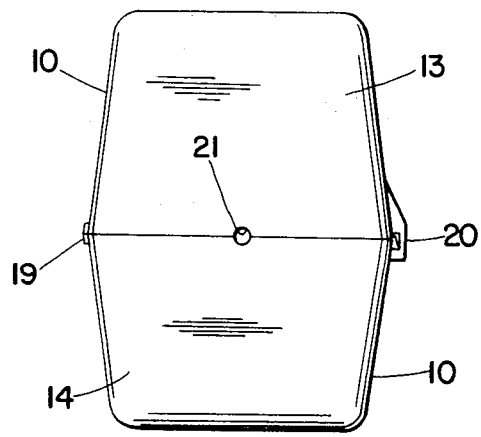
FIG. 4 is a front elevation view of the apparatus.

Said upper and lower halves are connected on one side by a molded, scored plastic live hinge 19 which runs along the mating edges of both said halves and is manufactured during the same process in which said upper and lower halves are formed. Said live hinge 19 is shown in FIGS. 4 and 5. Said upper and lower halves 13 and 14 are connected to each other by a fastener snap latch 20 with part of said fastener being associated with said upper half and the other part of said fastener being associated with said lower half of said cover. Said fastener snap latch is shown in FIGS. 3 and 4.

As seen in FIGS. 4 and 6 a hole 21 is provided in the front of the apparatus with said upper and lower halves being slotted partially as necessary to form the hole 21. Said upper half over-laps lower half on front and right side.

Shown in FIGS. 7 and 8 is the hook-bolt and wing-nut 11.

When installing this apparatus, the unit is open, i.e., said upper and lower halves are folded back and said hook-bolt is removed. Said bottom half of the unit is brought into close association with the bottom of the facuet and said hook-bolt is placed around the neck of the faucet. Said upper half of the apparatus is shut and said fastener snapped and the apparatus is tightened by rotating said wing-nut until said rubber foam end seal becomes attached to or forms a unit with the brick or wall.

From the foregoing it is obvious that the device described herein is easily attached to the faucets. Furthermore, it is obvious that this device can be manufactured cheaply since it is constructed very simply using unit and multiple step processes.

I claim:

1. An apparatus for protecting faucets comprising a cover, a rigid foam insulator enclosed in said cover, a threaded hook member for holding said cover firmly to the faucet or the like, a rubber foam end seal mounted on said cover, said cover being formed of two halves with each of said halves being formed in the horizontal plane together forming an upper and lower part of said cover, said rigid foam insulator being enclosed in each of said halves of said cover, said rubber foam end seal being mounted separately on each of said halves of said cover, said cover halves each having a partial hole therein on the front of each of said cover halves so that engagement of said cover halves to each other forms said cover having a hole therein on its front through which said threaded hook member passes, said threaded hook member attaching to the faucet by passing through said cover front and said enclosed insulator being formed having a central cavity therein for insertion of said faucet into said cavity.

2. The apparatus as recited in claim 1 wherein:
   (a) said two cover halves being permanently attached to each other by a scored edge forming a live hinge on each of two said cover halves;
   (b) said cover halves having means for tightly engaging each other being comprised of a snap latch on one of said cover halves and an over-lap edge on the other said cover half; and
   (c) said engagement means being formed of a snap latch and an over-lap edge being integrally molded into said respective halves of said cover.

* * * * *